United States Patent
Sheng et al.

(10) Patent No.: US 7,630,174 B2
(45) Date of Patent: Dec. 8, 2009

(54) SUSPENSION AND PROBER DESIGNS FOR RECORDING HEAD TESTING

(75) Inventors: Yong Sheng, Saratoga, CA (US); Jing Zhang, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 867 days.

(21) Appl. No.: 11/336,124

(22) Filed: Jan. 20, 2006

(65) Prior Publication Data

US 2007/0171576 A1    Jul. 26, 2007

(51) Int. Cl.
*G11B 5/48* (2006.01)

(52) U.S. Cl. .................................. 360/245.9

(58) Field of Classification Search ............. 360/245.9, 360/245.8, 244.3
See application file for complete search history.

(56) References Cited

U.S. PATENT DOCUMENTS

| | | | |
|---|---|---|---|
| 5,137,461 A | 8/1992 | Bindra et al. ............. | 439/74 |
| 5,311,405 A | 5/1994 | Tribbey et al. ............. | 361/767 |
| 5,420,520 A | 5/1995 | Anschel et al. ............. | 324/754 |
| RE35,119 E | 12/1995 | Blonder et al. ............. | 257/739 |
| 5,481,205 A | 1/1996 | Frey et al. ............. | 324/757 |
| 6,373,660 B1* | 4/2002 | Lam et al. ............. | 360/234.5 |
| 6,414,506 B2 | 7/2002 | Akram et al. ............. | 324/765 |
| 6,690,546 B2* | 2/2004 | Gouo ............. | 360/244.1 |
| 6,956,722 B2* | 10/2005 | Wada et al. ............. | 360/245.8 |
| 7,035,050 B1* | 4/2006 | Kulangara ............. | 360/245.9 |
| 7,468,866 B2* | 12/2008 | Yang et al. ............. | 360/245.9 |

FOREIGN PATENT DOCUMENTS

JP    10-173325    6/1998

\* cited by examiner

*Primary Examiner*—Angel A. Castro
(74) *Attorney, Agent, or Firm*—John L. Rogitz

(57) ABSTRACT

In testing HGAs used in a hard disk drive, to facilitate contact between a test prober and a HGA termination pad, read head termination pads may be provided with extensions along the tail of the HGA, and/or a sawtooth-shaped prober may be used.

4 Claims, 2 Drawing Sheets

SUSPENSION AND PROBER DESIGNS FOR RECORDING HEAD TESTING

I. FIELD OF THE INVENTION

The present invention relates generally to suspension design for magnetic recording heads used in hard disk drives and prober designs for testing magnetic recording heads.

II. BACKGROUND

In hard disk drives, sliders are suspended over spinning disks to exchange data with the disks. A slider may include both read and write heads. Sliders typically are supported by head-gimbal assemblies (HGA), with electrical traces extending from the slider, along the HGA, and terminating in solder pads that may be engaged by soldering or ultrasonic welding with similar pads on an arm electronics (AE) cable that in turn is electrically connected to the HDD controller. In this way, an electrical path is established between the controller and the read and write heads of the slider.

Prior to shipping the HGA to HDD assembly, it is desirable to test the HGA to ensure that any potential manufacturing defects are identified and appropriate action is taken. The tester used to perform HGA test includes a prober to make contact with the HGA pads.

The present invention recognizes that reliable contact between the prober and the HGA pads has grown increasingly challenging particularly as contact pad sizes are decreased, as they are in microdrive applications and in high data rate (HDR) drives. With this critical recognition in mind, the solutions herein are provided.

SUMMARY OF THE INVENTION

Accordingly, a head gimbal assembly (HGA) for a disk drive includes read termination pads near a tail portion of the HGA, with the read termination pads being connected to a read head using read traces on the HGA. Write termination pads are also provided. A respective electrically conductive pad extension touches each read termination pad and extends away therefrom in a direction opposite the write termination pad. The extensions are removed after testing.

In one implementation the extension extends from the read termination pad toward the tail portion, reducing if not eliminating cross-talk from the write termination pad during testing of the read termination pad. Another benefit in having the extensions extended in the tail direction is a reduced footprint for reduced suspension cost. For purposes to be disclosed below however, no extension need be provided for the write termination pad when an extension is provided for the read termination pad. The contact pads in extensions may be made of solder, gold, copper, or gold and copper alloys, or may be made of the same material as the read termination pads.

In another aspect, a method is disclosed for testing a HGA. The method includes forming an extension from a read termination pad and orienting the extension away from a write termination pad, and contacting the read termination pad and/or extension with a prober in a test system. At least a portion of the extension may be removed after testing.

In another aspect, testing HGAs is disclosed using a test system that includes a prober and other mechanical setup and electrical circuits. The test prober is designed so that there is a wide manufacturing tolerance to align the prober with pads in HGAs. Unlike conventional probers, which rely on a single contact point, the present prober has a contact surface made of multiple contact points so that alignment between prober and HGA pads becomes simpler.

In non-limiting implementations the contact surfaces are established by linear, generally co-parallel contact ridges, with adjacent ridges being separated from each other by intervening V-shaped channels to define a sawtooth configuration. Contact can be made between a read termination pad and at least one contact ride of the prober in the test system.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
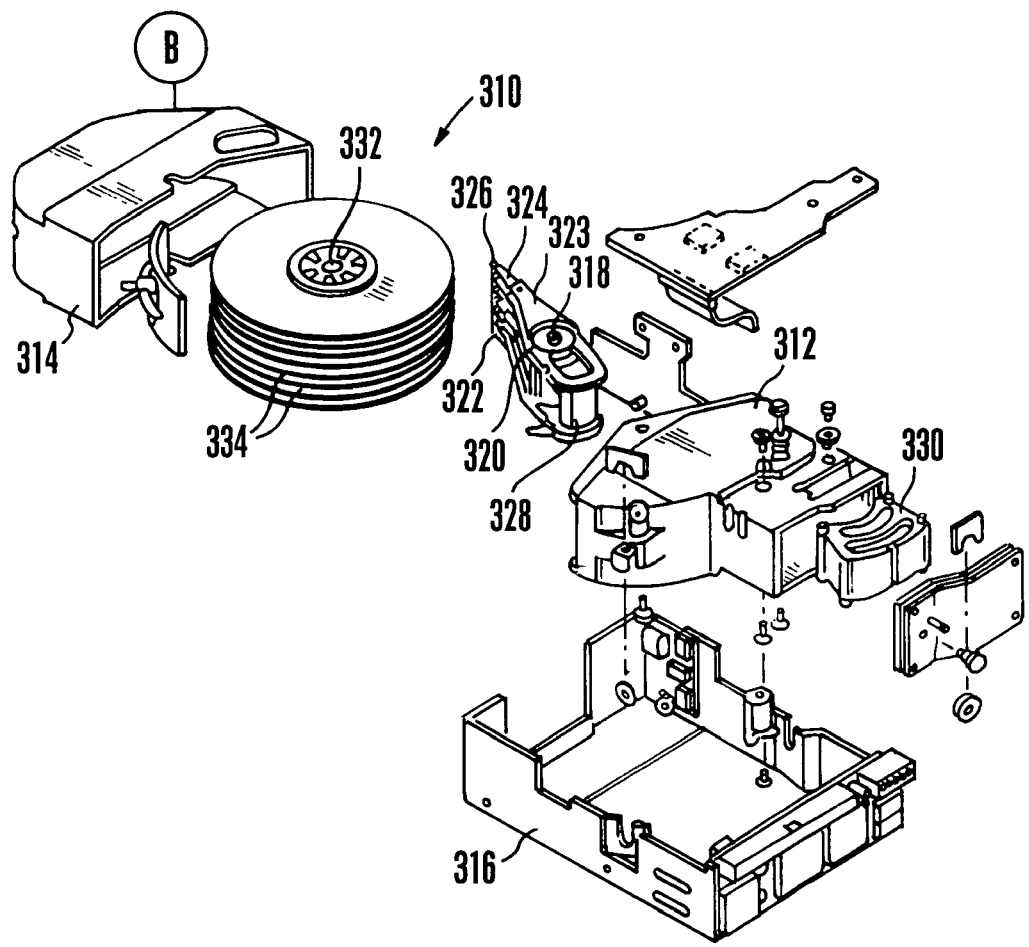
FIG. 1 is an exploded perspective view of a non-limiting hard disk drive.

Referring to FIG. 1 for a general overview of one non-limiting environment in which the present invention can be used, a rotary actuator is shown, although the invention described herein is also applicable to linear actuators.

A disk drive 310, which may be, e.g., a microdrive or a HDR drive, includes a housing 312, and a housing cover 314 which, after assembly, is mounted within a frame 316. Rotatably attached within the housing 312 on an actuator shaft 318 is an actuator arm assembly 320. One end of the actuator arm assembly 320 may include an E block or comb like structure 322 having a plurality of actuator arms 323. Attached to the separate arms 323 on the comb or E block 322 are spring suspensions 324, and at the end of each spring suspension is a slider 326 which carries a magnetic transducer. On the other end of the actuator arm assembly 326 opposite the spring suspensions 324 and the sliders 326 is a voice coil 328.

Attached within the housing 312 are a pair of magnets 330. The pair of magnets 330 and the voice coil 328 are parts of a voice coil motor which applies a force to the actuator assembly 320 to rotate it about the actuator shaft 318. Also mounted within the housing 312 is a spindle shaft 332. Rotatably attached to the spindle shaft 332 are a number of disks 334. In FIG. 1 eight disks are attached to the spindle shaft 332. The disks 334 are attached to the spindle shaft 332 in spaced apart relation.

Each suspension 324 can be a laminated suspension made of multiple layers of material etched using photolithographic techniques, as are well known in the industry, to create the suspension. These layers include a base layer preferably of stainless steel, an insulating layer preferably of polyimide, and a patterned conductive layer preferably of a copper alloy. This multilayered suspension may be formed by laminating three very thin sheets of different materials together, and consequently has two metal layers formed on either side of an insulating layer of polyimide that are processed using photo-lithographic techniques. All three layers are etched away to form the outline of a suspension, and then both sides of the suspension are etched to remove desired sections of the steel, polyimide and copper layers to produce the various features of the suspension. In particular, the copper layer is etched to produce the conductive lead structure which contains transmission wires and termination pads for electrically connecting the slider's transducer leads with termination pads located on the actuator arm, in accordance with disclosure below. As set forth further below, each suspension 324 electrically interconnects its attached slider with an arm electronics (AE) cable.

Figure 2:
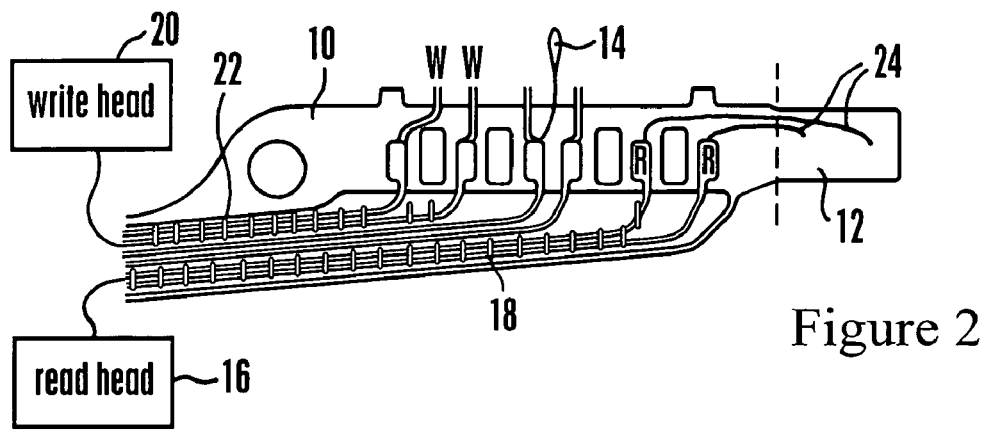
FIG. 2 is a side view of a head gimbal assembly (HGA)
Figure 3:
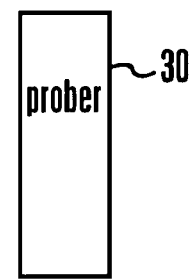
FIG. 3 is side elevational view of the prober in an exploded relationship with a contact pad.
Figure 4:
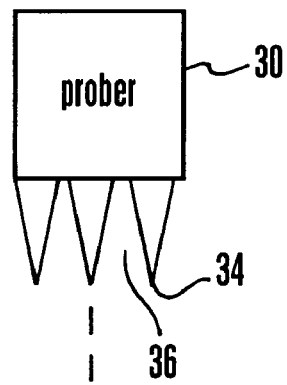
FIG. 4 is front elevational view of the prober in an exploded relationship with a contact pad.
Figure 5:
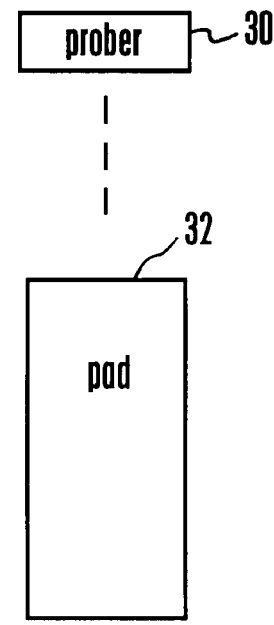
FIG. 5 is top plan view of the prober in an exploded relationship with a contact pad.
Figure 6:
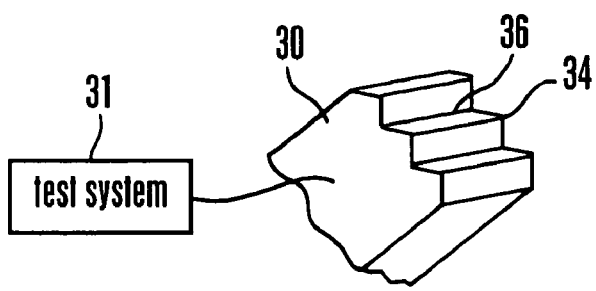
FIG. 6 is a perspective view of the end of the prober.

FIG. 2 shows one approach for ensuring adequate contact is made with HGA pads for testing. As shown, a head gimbal assembly (HGA) 10 includes at least two read termination pads "R" near a tail portion 12 of the assembly 10. Also, the HGA 10 includes at least two write termination pads "W" opposite the tail portion 12 as shown. The pads "R" and "W" may be made of Au, Cu, or Au and Cu alloys. If desired, one or more TFC pads 14 may be disposed on the HGA 10 between the read and write termination pads in accordance with HGA principles known in the art. The read termination pads "R" are connected to one or more read heads 16 using read traces 18, while the write termination pads "W" are connected to one or more write heads 20 using write traces 22.

As shown in FIG. 2, generally elongated contact pad extensions 24 are formed on the HGA 10. Each extension 24 touches a respective read termination pad "R", and each extension 24 extends away from its read termination pad "R" on the HGA 10 in the direction opposite the write termination pads "W", i.e., in the embodiment shown toward the tail portion 12 of the HGA 10, reducing if not eliminating cross-talk from the write termination pads "W" during testing. The extensions 24 are electrically conductive, and in non-limiting implementations each extension 24 may be made of the same solder material as the read termination pads, or may be made of gold. As critically recognized herein, similar extensions are not necessary for the write termination pads "W", because the read termination pads "R" are more susceptible to parasitic resistance than are the write termination pads "W". In writing process, it is in current bias mode with much higher overall reluctance.

In any case, a test prober thus may contact a read termination pad "R" proper or its extension 24 during test, yielding a greater contact area than what would be present with a read termination pad "R" alone. The prober is then used in accordance with principles known in the art to test HGA before being shipped for HDD build. As indicated by the word "cut" in FIG. 2, after testing and if desired the extensions 24 may be cut away or otherwise removed during, e.g., the head-slider-arm assembly process.

FIGS. 3-6 illustrate a second method to achieve improved prober-to-pad contact that can be used alone (i.e., with conventional pads) or in combination with the novel structure shown in FIG. 2. A prober 30 that is connected to a test system 31 is provided for contacting an elongated pad 32 that has an upper surface shaped roughly like an egg as shown. As shown, unlike conventional probers the prober 30 has two or more spaced-apart contact surfaces 34. The contact surfaces 34 may be established, in exemplary non-limiting embodiments, by linear, generally co-parallel and co-planar contact ridges, with adjacent ridges being separated from each other by intervening V-shaped channels 36, resulting in the sawtooth configuration shown.

The prober 30 can be operated by a test machine engaged with the prober to establish contact between a termination pad 32 and any one or more of the contact surfaces 34, with the multi-contact surface configuration of the prober 30 facilitating contact between pad and prober without requiring as tight an alignment tolerance as is otherwise required by current single contact surface probers. HGA testing is then conducted in accordance with principles known in the art.

While the particular SUSPENSION AND PROBER DESIGNS FOR RECORDING HEAD TESTING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A head gimbal assembly (HGA) for a disk drive, comprising:
    at least one read termination pad near a tail portion of the HGA, the read termination pad being connected to one or more read heads using read traces on the HGA;
    at least one write termination pad; and
    at least one electrically conductive pad extension touching the read termination pad and extending away therefrom in a direction opposite the write termination pad.

2. The HGA of claim 1, wherein the extension extends from the read termination pad toward the tail portion, reducing if not eliminating cross-talk from the write termination pad during testing of the read termination pad.

3. The HGA of claim 1, wherein no extension is provided for the write termination pad when an extension is provided for the read termination pad.

4. The HGA of claim 1, wherein the extension is made of the same material as the read termination pad, and/or is made of gold.

* * * * *